Patented June 16, 1942

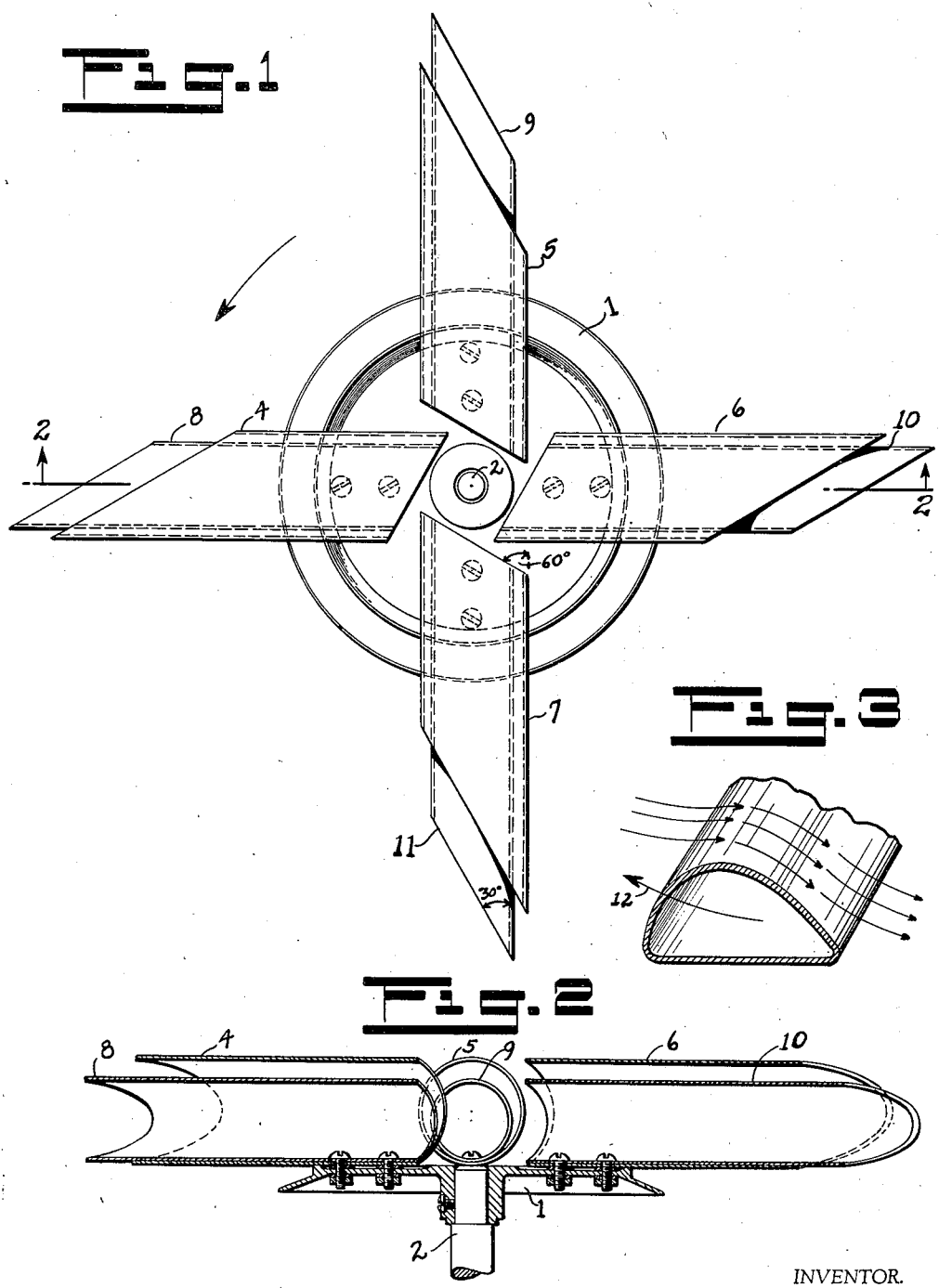

2,286,670

UNITED STATES PATENT OFFICE 2,286,670

FAN

Maurice M. Condon, Chappaqua, N. Y.

Application September 26, 1939, Serial No. 296,534

1 Claim. (Cl. 230—134)

The object of this invention is to provide a fan which will be simple and economical to manufacture, rugged in construction, and have a large capacity for displacing air.

A feature of the invention is the provision of revolving tubular members in place of the usual blades of a fan, said tubular members being angularly cut at their inner and outer ends.

Another feature of the invention is the provision of such tubular members of substantially equal cross-sectional area throughout their lengths.

Another feature of the invention is the provision of double tubular members, that is, one within another, to provide increased pressure.

Another feature of the invention is the provision of tubular members of airfoil contour.

Similar reference numerals refer to the same parts throughout the drawing.

In the drawing—

Figure 1 is a front elevation of my new fan mounted on a motor;

Figure 2 is a cross-section along the line 2—2 of Figure 1; and

Figure 3 is a sectional view in perspective of an alternative form of tubular member of airfoil contour.

In the drawing, there is illustrated a baffle or plate 1 having an opening therein to accommodate the shaft 2 of an electric motor to which the plate 1 is rigidly secured. Secured to the plate 1 by means of rivets, bolts or in any other similar manner, are a series of tubular members 4, 5, 6, 7, 8, 9, 10, 11. Each of these tubular members is secured directly to the plate 1, the tubes 8, 9, 10, 11, however, being mounted within and tangential to the tubes 4, 5, 6, 7, as shown. All of the tubes 4 to 11 are cut at their inner ends at an angle of approximately 60° to the leading edge and at their outer ends at an angle of approximately 30° to the leading edge, as indicated in Figure 1. The tubes 8 to 11 are longer than the tubes 4 to 7 and project beyond the ends of the tubes 4 to 7.

In the alternative form of the invention illustrated in Figure 3, the tubular members are of airfoil contour for reasons that will hereinafter be described.

The entire structure illustrated in Figures 1 and 2 is rotated in a counter-clockwise direction as illustrated by the arrow in Figure 1, while in the form of Figure 3 the member there illustrated would be moved in the direction of the arrow 12 in that figure.

It will be noted that when the tubes are rotated in the direction just indicated the beveled openings at the inner ends of the tubes tend to scoop air into the passages while at the outer ends of the tubes there is a leading edge cutting through the air and creating a partial vacuum behind this edge in the space occupied by the outer openings. It is obvious, of course, that the outer ends of the tubes will be rotating faster than the inner ends.

According to Bernouilli's theorem, dealing with the conservation of energy as applied to the flow of liquids in tubes, in a steady flow of air through a tube the total energy in any section of the tube is equal to the total energy at any other section in the direction of flow, plus the loss of energy due to friction in the distance between the two points. This theorem presupposes that an external force is being exerted upon the contents of the tube causing the air to move. The total energy is equal to pressure times velocity of the air within the tube. Thus the equation may be set down simply as $VP = V'P'$. As applied to opposite ends of the tube, the equation simply stating that the total head or energy at opposite ends of the tube is equal. If the velocity at one end of the tube exceeds the velocity at the other end, the pressure at the end of the higher velocity will be decreased and the pressure at the end of the lower velocity will be increased inversely.

The external force referred to above which is acting upon the air within my device is provided by rotation of the tubes. During rotation the outer openings travel faster than the inner openings and the velocity at the outer openings is accordingly greater than the velocity at the inner openings. Following Bernouilli's theorem, the pressure at the outer openings will, therefore, be less than the pressure at the inner openings and this difference in pressure will cause air to move through the tubes from the inner openings to the outer. The accumulation of pressure at the inner openings is increased by the angular cut of the tubes which presents an open end of the tube to the air as the tubes rotate. The pressure at the outer openings is decreased by the fact that the leading edges of the outer ends of the tubes create a partial vacuum behind them, thus reducing the pressure at the outer ends and again contributing to the effect of drawing air through the tubes.

What has been said above applies to my invention when it is practiced with only four tubes, which may be considered either as the tubes 4, 5, 6, 7, or as the tubes 8, 9, 10, 11. A fan built with only the four tubes mentioned will have all of the advantages referred to above and be the most desirable for many uses. A double tube or compound structure is simply an elaboration of the simple four tube type. When constructed of single tubes the fan operates at a higher velocity and lower pressure, while when constructed of double tubes it operates at lower velocity and higher pressure. Thus the particular form of fan to be used would depend upon the operating requirements of any particular installation.

It is obvious that the sizes of the different portions of my fan may vary considerably, but as a specific illustration of one fan which I have built and tested and found to operate very satisfactorily and to produce a tremendous flow of air at good pressure, that fan was of the simple form, that is having only four single tubes of circular cross-section of approximately 1¾" in diameter, the length of the tubes along their shorter length dimension being approximately 4¼", along the longer dimension approximately 5½", the angle between the forward edge of the tube and the inner opening approximately 60°, and the angle between the forward edge of the tube and the outer opening approximately 30°.

In Figure 3 is illustrated a tube of airfoil or streamline cross-section and contour. This tube would be used in my fan in exactly the same manner as the tubes already described, being cut at the same angles at its inner and outer ends. It can be used in either the single or double tube structure. If used in the double tube structure the inner and outer tubes would be in contact along the entire flat surface of the tube illustrated in Figure 3.

This construction of tube has a tractive force and if mounted on a movable motor will impel it forward in the direction opposite to the direction of the air which it draws, the tube creating a suction or tractive pull in the manner of a propeller. The use of tubes of this shape, therefore, combine two aerodynamic principles for the purpose of pulling air against a fan over an area equal to the area of a circle described by the tips of the tubes during rotation. While the fan illustrated in Figures 1 and 2 draws air only at the center of the fan, the fan illustrated in Figure 3 draws air over the entire area described by the tubes, as well as at the center. The form illustrated in Figure 3, therefore, has special advantages for use in free air where a greater area must be covered by the fan draft.

I am aware of United States Patents No. 509,321 issued November 21, 1893, to Marsden, and No. 730,099 issued June 2, 1903, to Dickie and Williams. In the Marsden patent the tubes are cut at approximately right angles at their inner ends and as they are curved they have, in effect, a leading edge cutting the air, tending to create a partial vacuum at the inner ends instead of creating a pressure such as is created with my fan. The positioning of these tubes at their inner ends, therefore, is such as to decrease the possible effect of the fan rather than to increase it. Also these tubes are curved, thus increasing their length without effectively increasing the speed of the outer ends in proportion, and introducing additional friction. The outer openings are also cut at right angles, thus providing a limited area over which a partial vacuum is created.

In the Dickie and Williams patent, the inner ends of the tubes are at right angles, presenting an extremely limited intake area, causing resistance to any pressure created by the rotation of the fan inasmuch as the intake area is decreased in proportion to the exhaust area. A cruciform deflector is provided, limiting the operation of each tube to the area within its particular quadrant, and the tubes are tapered, providing a larger area at the outer ends. This taper has the effect of providing an area at the outer ends of sufficient cross-section that the partial vacuum there created tends to draw air from the outside of the tube as well as from within it, thus creating a turbulence at the outer end of the tube which tends to defeat the object of the fan rather than assist it in accomplishing its purpose. Further the added weight on the outer extremes increases the centrifugal thrust and increases the strain on the entire structure.

My fan is distinguished from those shown in these two patents by having straight tubes cut at angles at their inner and outer ends and of equal cross-section throughout. This construction is much more efficient than the construction of either of the patents referred to, in addition to being simpler and more rugged.

My fan is further distinguished from the Marsden patent in that the tubes of the Marsden patent are rectangular in cross-section. Although my tubes could be made of rectangular cross-section without sacrificing all of the advantages of my construction, it is more desirable to make them curved on their inner surfaces, thus avoiding all angles and providing a smoother and more regular surface for the flow of air.

I do not desire, of course, to be limited to the precise construction shown and described but only within the scope of the appended claim. For example, more or less than four tubes could be used, the fan could be made double for drawing air from opposite directions toward the fan, etc.

What I claim is:

A fan having tubular blades cut at both ends at an angle of less than 90° with respect to their leading edges, said blades being mounted with their axes extending radially of the axis of rotation, a second set of tubular blades longer than said first set and mounted within said first mentioned blades so that they extend beyond the outer edges of said first blades, said second blades likewise being cut at both ends at an angle of less than 90° with respect to their leading edges, and means for rotating said blades.

MAURICE M. CONDON.